United States Patent
Cordova et al.

(10) Patent No.: US 11,747,143 B2
(45) Date of Patent: Sep. 5, 2023

(54) METHODS AND SYSTEM FOR COMBINING SENSOR DATA TO MEASURE VEHICLE MOVEMENT

(71) Applicant: Cambridge Mobile Telematics Inc., Cambridge, MA (US)

(72) Inventors: Brad Cordova, Cambridge, MA (US); Sanujit Sahoo, Somerville, MA (US); Nicholas Arcolano, Cambridge, MA (US); John Emhoff, Watertown, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 260 days.

(21) Appl. No.: 17/084,364

(22) Filed: Oct. 29, 2020

(65) Prior Publication Data

US 2021/0063161 A1    Mar. 4, 2021

Related U.S. Application Data

(63) Continuation of application No. 16/043,850, filed on Jul. 24, 2018, now Pat. No. 10,852,141, which is a continuation of application No. 15/353,340, filed on Nov. 16, 2016, now Pat. No. 10,054,446.

(60) Provisional application No. 62/256,511, filed on Nov. 17, 2015.

(51) Int. Cl.
| | | |
|---|---|---|
| G01C 21/16 | (2006.01) |
| G01C 21/18 | (2006.01) |
| H04W 4/02 | (2018.01) |
| H04W 4/029 | (2018.01) |
| G01C 21/30 | (2006.01) |
| H04W 4/40 | (2018.01) |

(52) U.S. Cl.
CPC ......... *G01C 21/1654* (2020.08); *G01C 21/18* (2013.01); *G01C 21/30* (2013.01); *H04W 4/026* (2013.01); *H04W 4/027* (2013.01); *H04W 4/029* (2018.02); *H04W 4/40* (2018.02)

(58) Field of Classification Search
USPC ....................................................... 701/446
See application file for complete search history.

(56) References Cited

U.S. PATENT DOCUMENTS

| | | | |
|---|---|---|---|
| 7,990,314 B2 | 8/2011 | Liao | |
| 8,457,880 B1 | 6/2013 | Malalur et al. | |
| 10,054,446 B2 | 8/2018 | Cordova et al. | |
| 10,231,093 B2 * | 3/2019 | Cordova | ............... H04W 4/027 |
| 10,952,044 B2 * | 3/2021 | Cordova | ............... B60W 40/09 |

(Continued)

OTHER PUBLICATIONS

U.S. Appl. No. 15/353,340, "Non-Final Office Action", dated Sep. 28, 2017, 14 pages.

(Continued)

*Primary Examiner* — Tyler D Paige
(74) *Attorney, Agent, or Firm* — Kilpatrick Townsend & Stockton LLP

(57) ABSTRACT

Embodiments of the present invention provide systems and methods for combining sensor data to measure vehicle movement. Embodiments may collect vehicle and driving data using sensors of a mobile device of a user, such as a location determination sensor and a movement determination sensor. In some embodiments, the data from the sensors may be combined to more accurately estimate vehicle movement, such as vehicle acceleration.

20 Claims, 8 Drawing Sheets

(56) References Cited

U.S. PATENT DOCUMENTS

| | | |
|---|---|---|
| 2012/0136573 A1 | 5/2012 | Janardhanan et al. |
| 2012/0158296 A1 | 6/2012 | Waters et al. |
| 2013/0344859 A1 | 12/2013 | Abramson et al. |
| 2014/0046701 A1 | 2/2014 | Steinberg et al. |
| 2014/0149145 A1 | 5/2014 | Peng et al. |
| 2014/0180730 A1 | 6/2014 | Cordova et al. |
| 2015/0045983 A1 | 2/2015 | Fraser et al. |
| 2015/0233718 A1 | 8/2015 | Grokop |
| 2015/0300827 A1 | 10/2015 | Malalur et al. |
| 2015/0312404 A1 | 10/2015 | Abramson et al. |
| 2015/0332518 A1 | 11/2015 | Menon et al. |
| 2015/0369836 A1* | 12/2015 | Cordova ............. G01P 15/18 702/141 |
| 2016/0007158 A1 | 1/2016 | Venkatraman et al. |
| 2016/0016590 A1 | 1/2016 | Fernandez Pozo et al. |
| 2016/0049017 A1 | 2/2016 | Busse et al. |
| 2016/0062949 A1 | 3/2016 | Smith et al. |
| 2016/0069690 A1 | 3/2016 | Li et al. |
| 2016/0272196 A1 | 9/2016 | Hocking et al. |
| 2017/0138737 A1 | 5/2017 | Cordova et al. |
| 2017/0349182 A1 | 12/2017 | Cordova et al. |
| 2019/0086210 A1* | 3/2019 | Cordova ............. H04W 4/027 |
| 2019/0182638 A1* | 6/2019 | Cordova ............. H04W 4/38 |

OTHER PUBLICATIONS

U.S. Appl. No. 15/353,340, "Notice of Allowance", dated Apr. 26, 2018, 9 pages.

U.S. Appl. No. 16/043,850, "Final Office Action", dated Apr. 15, 2020, 9 pages.

U.S. Appl. No. 16/043,850, "Non-Final Office Action", dated Nov. 8, 2019, 22 pages.

U.S. Appl. No. 16/043,850, "Notice of Allowance", dated Jul. 28, 2020, 10 pages.

* cited by examiner

METHODS AND SYSTEM FOR COMBINING SENSOR DATA TO MEASURE VEHICLE MOVEMENT

CROSS-REFERENCES TO RELATED APPLICATIONS

This application is a continuation application of U.S. patent application Ser. No. 16/043,850, filed on Jul. 24, 2018; which is a continuation application of U.S. patent application Ser. No. 15/353,340, filed on Nov. 16, 2016, now U.S. Pat. No. 10,054,446, issued on Aug. 21, 2018; which claims priority to U.S. Provisional Patent Application No. 62/256,511, filed on Nov. 17, 2015, the disclosures of all of which are hereby incorporated by reference in their entireties for all purposes.

FIELD OF THE INVENTION

Embodiments of the invention relate generally to sensors on mobile devices, and more specifically, to systems and methods for combining sensor data from mobile devices to measure vehicle movement.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device.

Some systems have been developed to track driving behaviors including speed, braking, and turn speed. For example, external devices that plug into a vehicle's computer system have been integrated with vehicles to track driving behavior. Some driving behaviors of interest relate to vehicle movement behavior, such as acceleration, turning, and braking.

SUMMARY OF THE INVENTION

Despite the progress made in relation to collecting data related to drivers and their driving behavior, there is a need in the art for improved systems and methods for accurately determining vehicle movement. Embodiments of the present invention meet this need and others by providing systems and methods for combining sensor data to measure vehicle movement. Embodiments may collect vehicle and driving data using sensors of a mobile device of a user. In some embodiments, the data from the sensors may be combined to more accurately estimate vehicle movement.

According to some embodiments of the invention, a system is provided. The system comprises a mobile device including a plurality of sensors. The plurality of sensors include a location determination sensor and a movement determination sensor. The system further comprises a memory. The system further comprises a processor coupled to the memory. The processor is configured to perform operations including obtaining a plurality of location measurements from the location determination sensor during a trip in the vehicle. The operations further include obtaining a plurality of movement measurements from the movement determination sensor during the trip in the vehicle. Each of the plurality of location measurements is associated with a movement measurement of the plurality of movement measurements. The operations further include identifying a turn in the vehicle using at least one of the plurality of location measurements or the plurality of movement measurements. The operations further include determining a subset of the plurality of movement measurements that correspond to the turn in the vehicle. The operations further include identifying a plurality of remaining movement measurements by removing the subset from the plurality of movement measurements. The operations further include determining an acceleration measurement for the vehicle using the plurality of remaining movement measurements.

According to some embodiments of the invention, a method is provided. The method comprises obtaining a plurality of location measurements from a location determination sensor of a mobile device during a trip in a vehicle. The method further comprises obtaining a plurality of movement measurements from a movement determination sensor of the mobile device during the trip in the vehicle. Each of the plurality of location measurements is associated with a movement measurement of the plurality of movement measurements. The method further comprises identifying a turn in the vehicle using at least one of the plurality of location measurements or the plurality of movement measurements. The method further comprises determining a subset of the plurality of movement measurements that correspond to the turn in the vehicle. The method further comprises identifying a plurality of remaining movement measurements by removing the subset from the plurality of movement measurements. The method further comprises determining an acceleration measurement for the vehicle using the plurality of remaining movement measurements.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION OF SPECIFIC EMBODIMENTS

Figure 1:
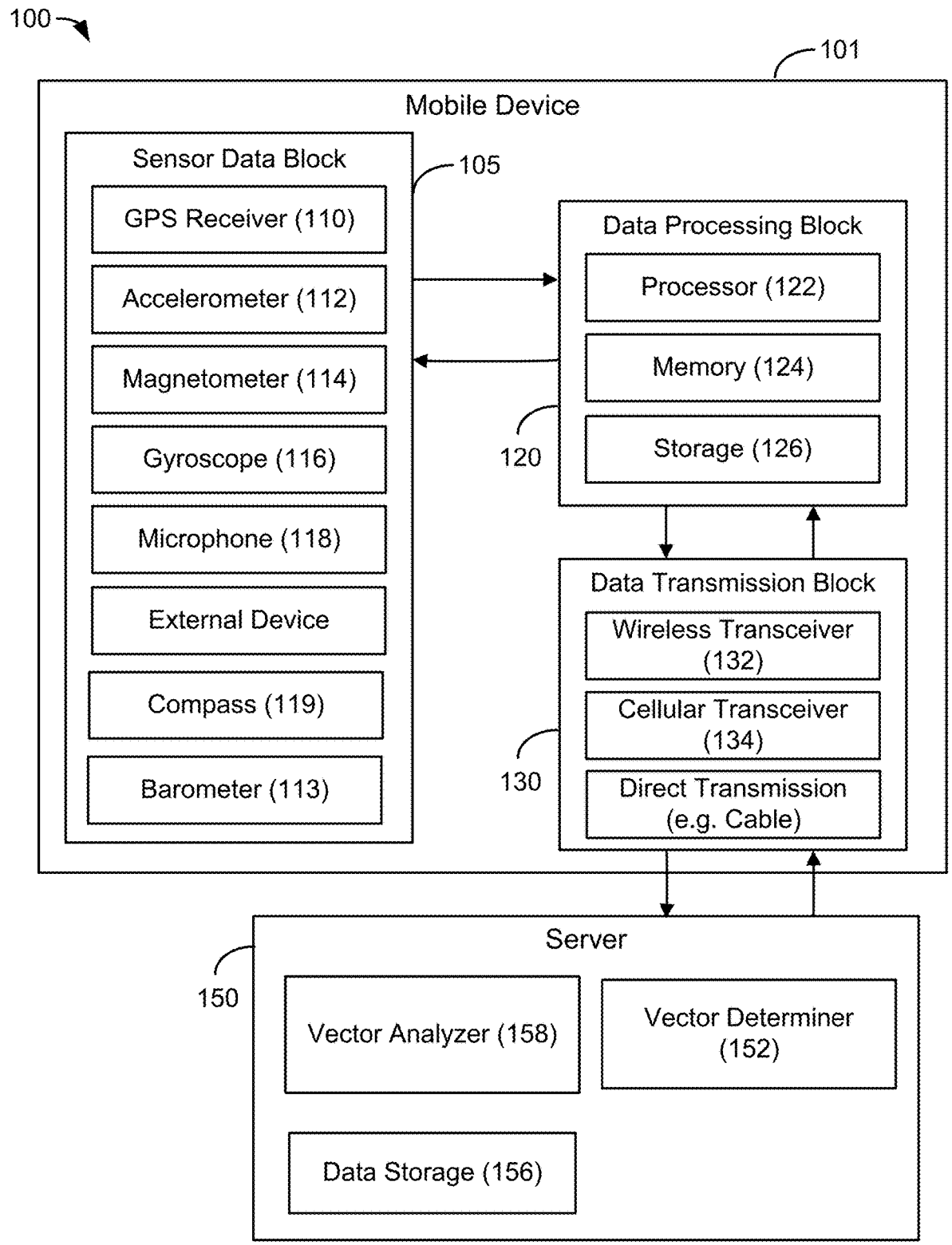
FIG. 1 is a system diagram illustrating a mobile device according to some embodiments of the present invention.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Embodiments of the present invention utilize mobile devices to provide information on a user's behaviors during transportation. For example, a mobile device carried by a user could be used to analyze driving behavior. Important driving behaviors that can be identified by some embodiments are braking behaviors and acceleration behaviors.

As discussed below, some embodiments described herein use approaches to collecting and analyzing driving data similar to the approaches described in U.S. patent application Ser. No. 15/149,603, filed May 9, 2015, entitled "METHODS AND SYSTEMS FOR SENSOR-BASED VEHICLE ACCELERATION DETERMINATION," (hereinafter "the '603 application"), U.S. patent application Ser. No. 15/149,613, filed May 9, 2016, entitled "METHODS AND SYSTEMS FOR SENSOR-BASED DRIVING DATA COLLECTION" (hereinafter "the '613 application"), U.S. patent application Ser. No. 14/749,232, filed Jun. 24, 2015, entitled "METHODS AND SYSTEMS FOR ALIGNING A MOBILE DEVICE TO A VEHICLE" (hereinafter "the '232 application"), U.S. patent application Ser. No. 15/249,967, filed Aug. 29, 2016, entitled "METHODS AND SYSTEMS FOR PRESENTING COLLECTED DRIVING DATA," (hereinafter "the '967 application"), U.S. patent application Ser. No. 14/749,232, filed Jun. 24, 2015, entitled "METHODS AND SYSTEMS FOR ALIGNING A MOBILE DEVICE TO A VEHICLE," (hereinafter "the '232 application"), U.S. Provisional Patent App. No. 62/324,168, filed Apr. 18, 2016, entitled "METHODS AND SYSTEMS FOR ORIENTING A MOBILE DEVICE TO A VEHICLE'S REFERENCE FRAME," (hereinafter "the '168 application"), these applications being incorporated by reference herein in their entirety for all purposes (hereinafter referred to collectively as "the Incorporated Applications"). Specific examples of the use of different embodiments disclosed in these applications ("the Incorporated Applications") are provided herein, and one having skill in the relevant art(s), will appreciate how additional approaches described in these applications can be used some embodiments described herein.

FIG. 1 is a system diagram illustrating a system 100 for collecting driving data according to an embodiment of the present invention. System 100 includes a mobile device 101 having a number of different components. Mobile device 101 includes a sensor data block 105, a data processing block 120, and a data transmission block 130. The sensor data block 105 includes data collection sensors as well as data collected from these sensors that are available to mobile device 101. This can include external devices connected via Bluetooth, USB cable, etc. The data processing block 120 includes storage 126, and manipulations done to the data obtained from the sensor data block 105 by processor 122. This includes, but is not limited to, analyzing, classifying, characterizing, subsampling, filtering, reformatting, etc. Data transmission block 130 may include, for example, a wireless transceiver 132, a cellular transceiver 134, wired transmission means, and/or the like. Data transmission block 130 may handle any transmission of the data off the mobile device 101 to an external computing device that can also store and manipulate the data obtained from sensor data block 105. The external computing device may be, for example, a server 150. Server 150 may comprise its own processor (not shown) and data storage 156, as well as a vector analyzer 158 and a vector determiner 152.

Some embodiments of the present invention are described using examples where driving data is collected using mobile devices 101, and these examples are not limited to any particular mobile device. As examples, a variety of mobile devices including sensors such as movement determination sensors (e.g., accelerometers 112, gyroscopes 116, etc.), compasses 119, barometers 113, location determination sensors such as global positioning system (GPS) receivers 110, communications capabilities, and the like are included within the scope of embodiments of the invention. Exemplary mobile devices 101 include smart watches, fitness monitors, Bluetooth headsets, tablets, laptop computers, smart phones, music players, movement analysis devices, and other suitable devices. Many variations, modifications, and alternatives may be implemented according to some embodiments of the invention.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". With many mobile devices 101, the sensors used to collect data are components of the mobile device 101, and use power resources available to mobile device 101 components, e.g., mobile device battery power and/or a data source external to mobile device 101.

Some embodiments use settings of a mobile device to enable different functions described herein. For example, in Apple iOS and/or Android OS, having certain settings enabled can enable certain functions of embodiments. For some embodiments, having location services enabled allows the collection of location information from the mobile device (e.g., collected by global positioning system (GPS) sensors), and enabling background app refresh allows some embodiments to execute in the background, collecting and analyzing driving data even when the application is not executing. As used herein, "location information", "location measurements" and/or "location data" may indicate any data that can be received from GPS receiver 110, even data that does not indicate a location, e.g., speed, bearing, time, etc.

Figure 2:
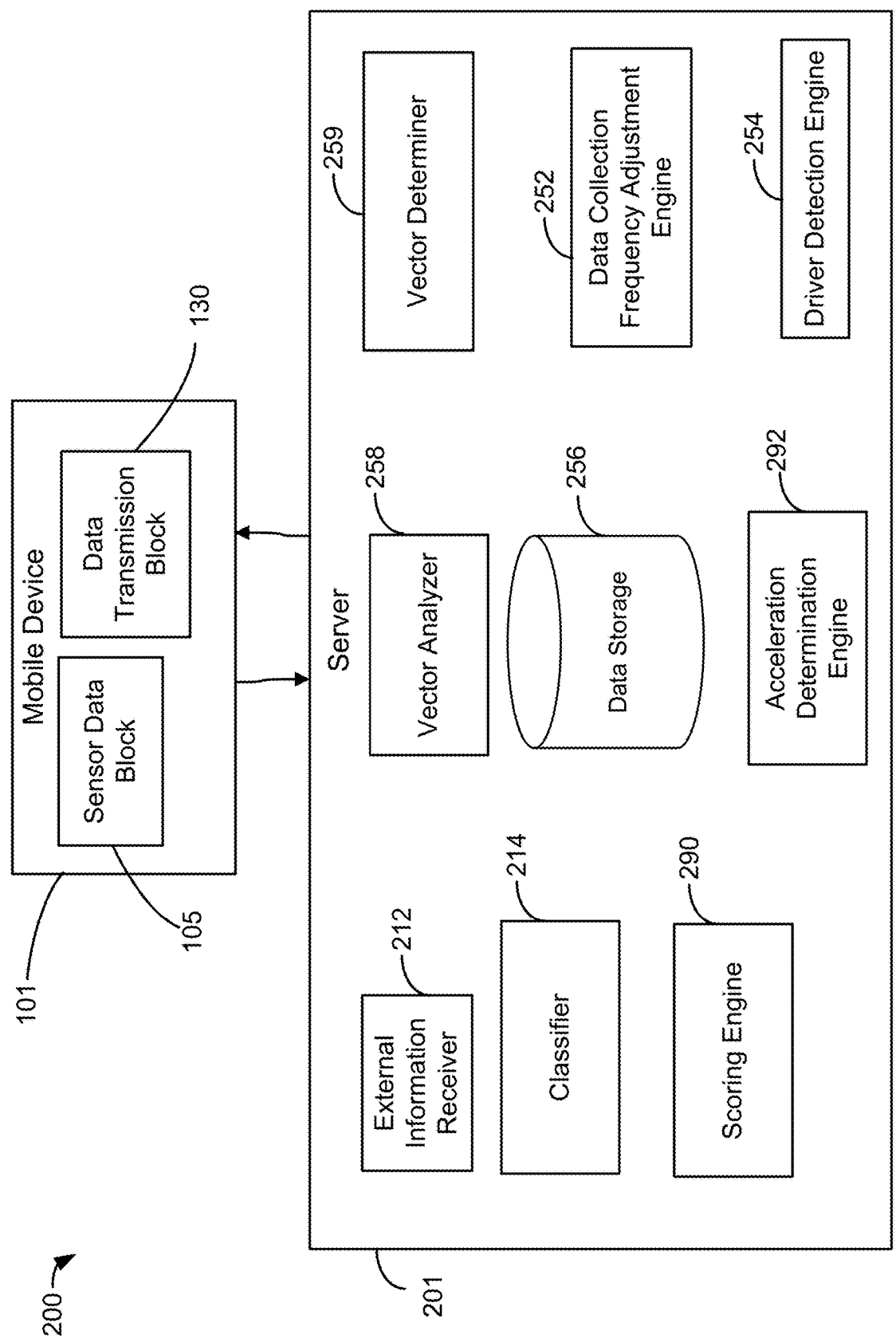
FIG. 2 is a system diagram illustrating a server according to some embodiments of the present invention.

FIG. 2 shows a system 200 for collecting driving data that can include a server 201 that communicates with mobile device 101. In some embodiments, server 201 may provide functionality using components including, but not limited to, vector analyzer 258, vector determiner 259, external information receiver 212, classifier 214, data collection frequency engine 252, acceleration determination engine 292, and driver detection engine 254. These components may be executed by processors (not shown) in conjunction with memory (not shown). Server 201 may also include data storage 256. It is important to note that, while not shown, one or more of the components shown operating using server 201 and the analysis processes descried herein, can operate alternatively or additionally, fully or partially, using mobile device 101.

To collect data associated with the driving behavior of a driver, one or more sensors on mobile device 101 (e.g., the sensors of sensor data block 105) may be operated close in time to a period when mobile device 101 is with the driver when operating a vehicle—also termed herein "a drive" or "a trip". An example of using components similar to data collection frequency engine 252, and driver detection engine 254 to operate mobile device 101 sensors is described in the Incorporated Applications. Once the mobile device sensors have collected data (and/or in real time), some embodiments analyze the data to determine acceleration vectors for the vehicle, as well as different features of the drive. Examples of processes to detect and classify driving features using classifier 214, and determine acceleration vectors using vector analyzer 258 and vector determiner 259, used by some embodiments as described in the Incorporated Applications. External data (e.g., weather) can be retrieved and correlated with collected driving data. Examples of using components similar to external information receiver 212 are described in the Incorporated Applications.

As discussed herein, some embodiments can transform collected sensor data (e.g., driving data collected using sensor data block 105) into different results, including, but not limited to, estimates of the occurrence of times where a driver was using the device. Examples of collecting driving data using sensors of a mobile device are described herein and in the Incorporated Applications. Examples of analyzing collected driving data to detect the occurrence of driving events are also described herein and in the Incorporated Applications.

As discussed further below, some embodiments analyze collected driving data and assign scores based on different criteria. Some embodiments use scoring engine 290 to analyze relevant data and rules, and generate scores for embodiments. The assignment of scores is discussed further in U.S. Provisional Pat. App. No. 62/286,218 and U.S. Provisional Pat. App. No. 62/346,013, herein incorporated by reference in their entireties.

Although shown and described as being contained within server 201, it is contemplated that any or all of the components of server 201 may instead be implemented within mobile device 101. It is further contemplated that any or all of the functionalities described herein may be performed during a drive, in real time, or after a drive.

Combining Location Measurements and Movement Measurements Using Turn Detection

Figure 3:
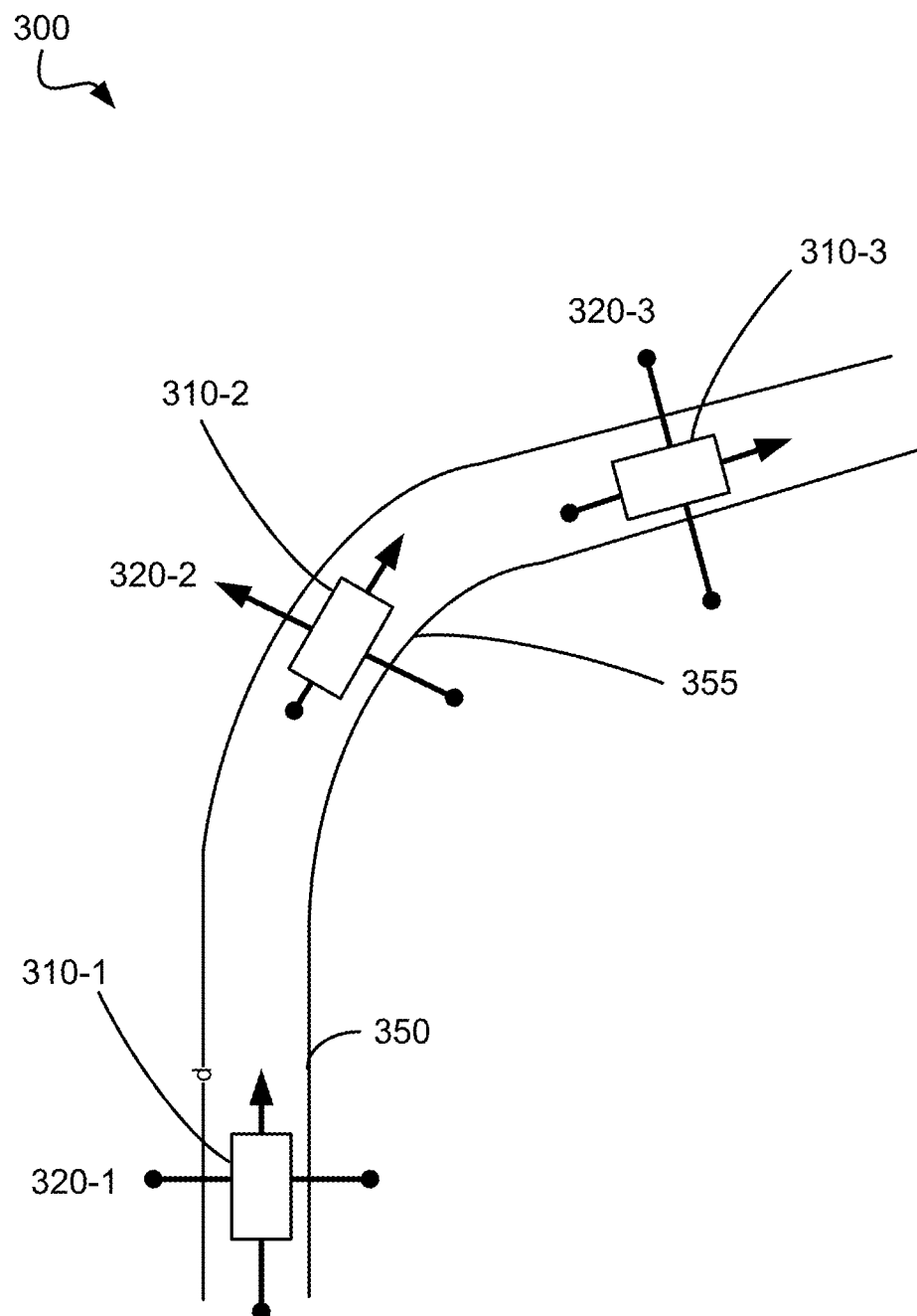
FIG. 3 is a block diagram illustrating a vehicle making a turn according to some embodiments of the present invention.

In some embodiments, vehicle behavior (e.g., acceleration) may be measured more accurately by combining measurements from location determination sensors and movement determination sensors. FIG. 3 shows vehicle 310 traveling on a road 350 having a curve 355. As noted herein, some embodiments rely upon accelerometer data as higher frequency data combined with GPS receiver 110 data to estimate speed and acceleration. For some embodiments, only forward acceleration of vehicle 350 is used to estimate driving behavior.

In some embodiments where accelerometer data is not aligned with vehicle movement, vehicle cornering can cause a degradation of the quality of accelerometer 112 data. FIG. 3 illustrates the potential for erroneous acceleration by showing lateral acceleration 320 during turn 355. At positions 310-1 and 310-3, lateral acceleration is not a problem, but at 310-2, lateral acceleration 320-2 can cause the estimated forward acceleration of vehicle 310, as measured by accelerometer 112 to be less accurate.

Figure 4:
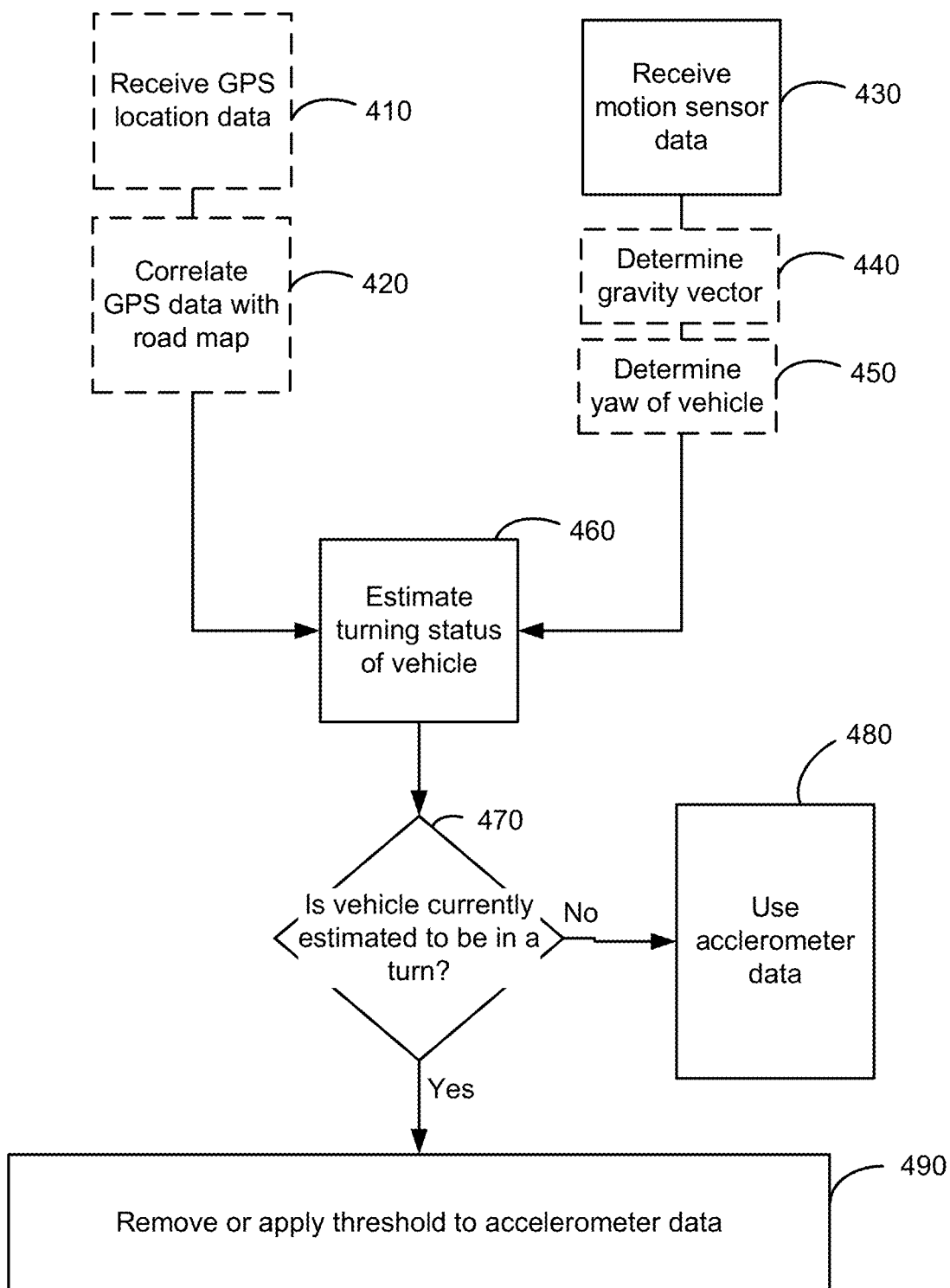
FIG. 4 is a flow diagram illustrating a process for making more accurate acceleration determinations according to some embodiments of the present invention.

FIG. 4 shows a method used by some embodiments to improve the accuracy of accelerometer 112 data during vehicle turns 355. The method begins in block 430 with server 201 receiving motion sensor data (e.g., from accelerometer 112 and/or gyroscope 116). Next, in optional block 440, using processes such as those described herein, a gravity vector is determined using the motion data.

In optional block 450, an estimate of the yaw of the vehicle is generated. In some approaches, the yaw value is measured in a direction around a z-axis aligned with an acceleration due to gravity. The Incorporated Applications describe determining yaw using one or more motion sensors and different approaches.

Block 460 estimates the turning status of the vehicle. Some embodiments use the time derivative of yaw to quantify an estimate of the extent to which the vehicle is turning, if at all. When time derivative of yaw exceeds a threshold, the vehicle is estimated to be in a turn 355. Some embodiments can use different approaches to determining the extent to which the vehicle is turning.

Blocks 440 and 450 are shown as optional because blocks 410 and 420 can also be used to estimate the turning status of a vehicle. In optional block 410, GPS receiver 110 data is received, e.g., location data corresponding to the location of the vehicle on the Earth. In block 420, this location data is correlated with a road map (e.g., a road map retrieved using external information receiver 212). Using correlated data, block 460 can estimate the turning status of the vehicle by determining whether the location data indicates that the vehicle is mapped to a turn on the road map of block 420.

In decision block 470, the extent to which the vehicle is turning is tested. If the vehicle is not estimated to be in a turn, block 480 specifies that no mediation of accelerometer data occurs. Alternatively, once a turning state is detected, some embodiments use block 490 to mediate the accelerometer 112 data in different ways. In one approach, all data collected during any degree of a turn is removed from the results data set. Other embodiments reflect the recognition that turns are a frequent site of relevant driving behavior, e.g., hard acceleration, and/or hard braking. Completely removing this data can, for some embodiments, result in missed events, while including the data collected in a turn could potentially lead to false positive results. Alternatively, a turning threshold can be established under which accelerometer data can be used. As discussed herein, aligning mobile device 101 to the vehicle can also allow vehicle turning to be measured.

Figure 5:
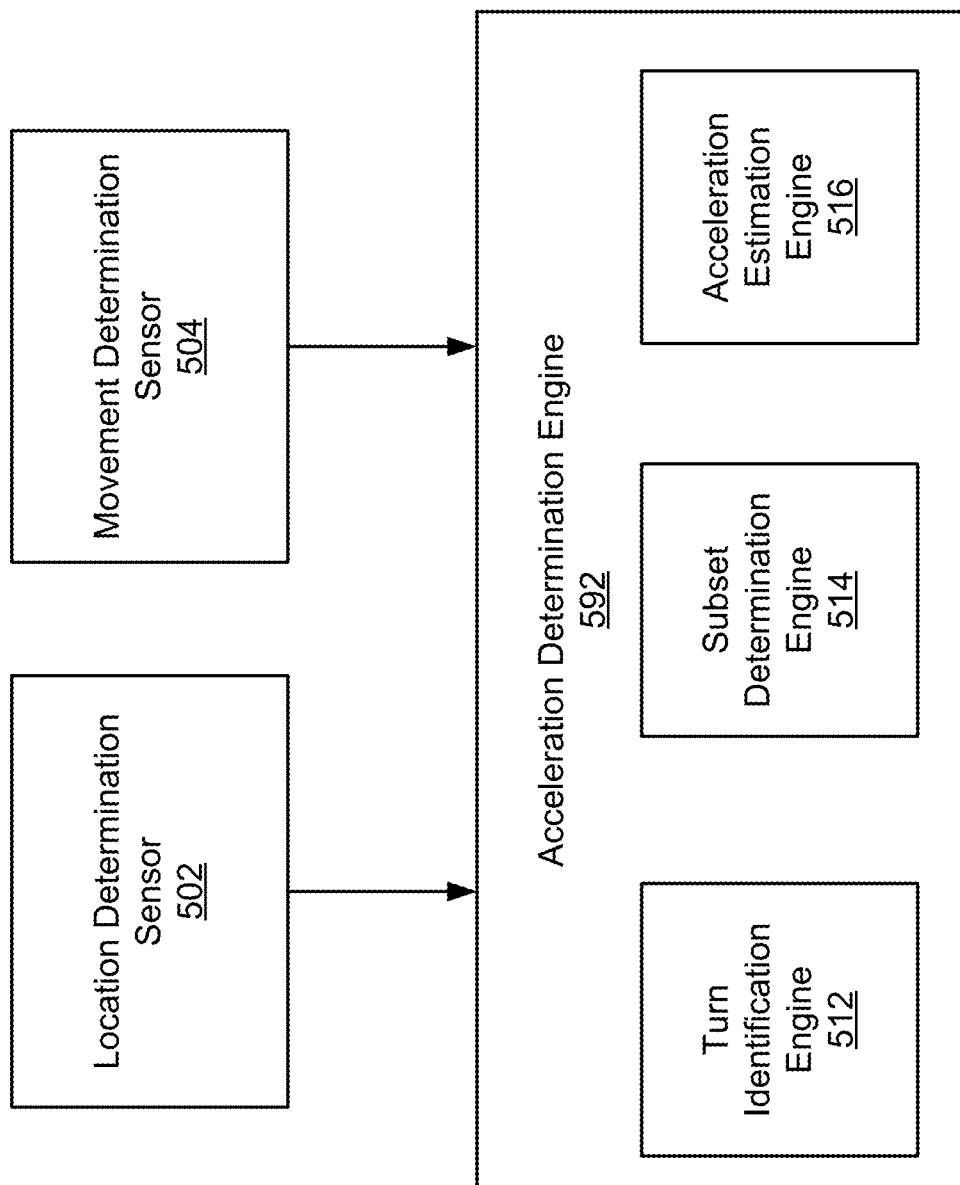
FIG. 5 is a system diagram illustrating an acceleration determination engine according to some embodiments of the present invention.

FIG. 5 is a block diagram of an acceleration determination engine 592 that may be implemented in a server 201 or a mobile device 101 according to some embodiments of the invention to perform the methods described herein. For example, acceleration determination engine 592 of FIG. 5 may be equivalent to acceleration determination engine 292 in server 201 of FIG. 2. Acceleration determination engine 592 may be configured to determine an acceleration of a vehicle using both location measurements and movement measurements. Using both location measurements and movement measurements may allow the acceleration determination engine 592 to more accurately estimate the acceleration of the vehicle. It should be appreciated that, because the measurements determined by some embodiments (e.g., acceleration, deceleration, turning forces and/or other vehicle events) can be analyzed by some embodiments to estimate driving behavior of a person, even small improvements in the accuracy of the data determined can be significant. Embodiments described herein can improve the accuracy of data collected by these two types of sensors by using independent methods to combine location measurements and movement measurements together in different ways. The approaches described herein can be implemented singly or in combination with each other. For approaches where values for the same variables result (e.g., two independently determined acceleration values), approaches can be used to either select one approach and/or beneficially combine the values (e.g., an average, or other approach to combining values). In addition, acceleration determination engine 592 may remove certain information, such as measurements made within turns, from acceleration determinations, as they may not accurately represent the true acceleration of the vehicle.

Acceleration determination engine 592 may receive location measurements from location determination sensor 502 and movement measurements from movement determination sensor 504, during a trip in a vehicle. Location determination sensor 502 may be, for example, a GPS device. Movement determination sensor 504 may be for example, an accelerometer and/or a gyroscope. Location determination sensor 502 and movement determination sensor 504 may be provided in mobile device 101. Location determination sensor 502 and movement determination sensor 504 may provide different measurements representative of the same movement of a vehicle. For example, information can be received from location determination sensor 502 that allow for the determination of the speed and position of the vehicle, and monitoring the changes in this speed and position may enable the acceleration and deceleration of the vehicle to be estimated. Acceleration and deceleration may also be estimated using movement measurements from the movement determination sensor 504 by applying different techniques, such as are described in the Incorporated Applications.

Thus, as a vehicle is moving with mobile device 101 inside, information from movement determination sensor 504 and location determination sensors 502 may each be used to estimate movement characteristics of the vehicle (e.g., acceleration and/or speed), albeit in different ways (e.g., using the approaches described above and in the Incorporated Applications). Certain characteristics of these two types of sensors may be appreciated. One area where the two types of sensors differ is the frequency of the received information, e.g., location determination sensor 502 measurements are typically received at one tenth the rate of movement determination sensor 504 measurements, e.g., respectively 1 Hz as compared to 5-100 Hz. In addition, operation of location determination sensor 502 may drain the battery of the mobile device at a faster rate than operation of movement determination sensor 504.

Another area where the sensors differ is in the accuracy of their data. For example, the data from a location determination sensor 502 can, in some embodiments, have less bias but more uncertainty, due in part to a generally lower sampling rate of the GPS receiver 110 measurements. In contrast, movement determination sensors 504 benefit from higher-frequency measurements in some embodiments, but can accumulate a large bias due to the temporal integration of acceleration errors, and/or other similar problems. Thus, combining or comparing measurements from the location determination sensor 502 with the measurements from movement determination sensor 304 may be beneficial in some embodiments.

The location measurements from the location determination sensor 502 and the movement measurements from the movement determination sensor 504 may be provided to a turn identification engine 512. The turn identification engine 512 may be configured to at least one movement measurement or at least one location measurement to identify a turn in the vehicle in some embodiments. In some embodiments, the turn identification engine 512 may be configured to use at least one movement measurement together with at least one location measurement to identify a turn in the vehicle.

Figure 6:
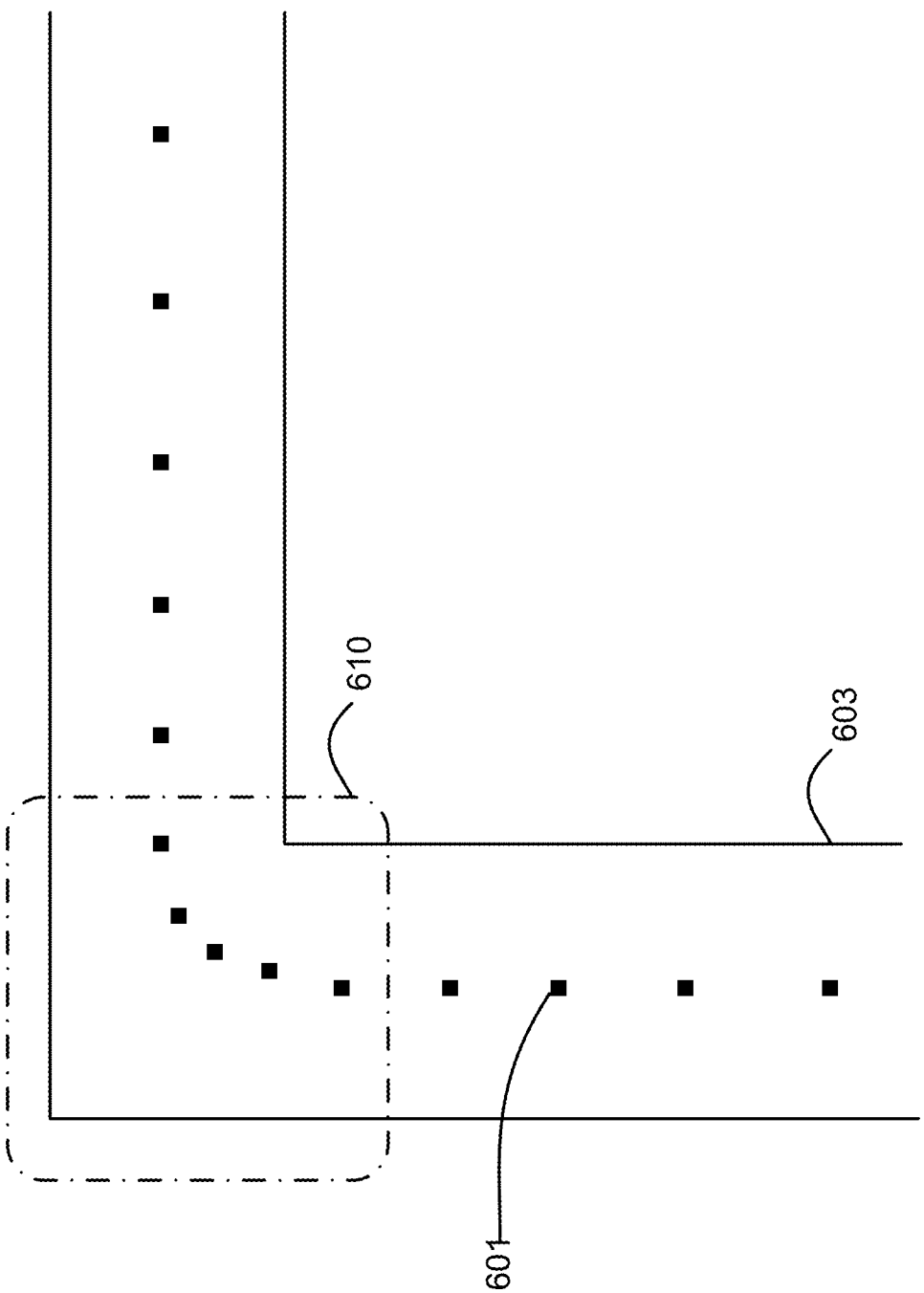
FIG. 6 is a block diagram illustrating a road map and location measurements according to some embodiments of the invention.

In some embodiments, the turn identification engine 512 may identify a turn using the location measurements. For example, the turn identification engine 512 may identify a turn by identifying a road map corresponding to the location measurements, and correlating the location measurements to the road map to identify a turn. FIG. 6 illustrates a road map including road 603. The location measurements (e.g., a latitude and longitude) may be taken at each of points 601, and points 601 may be mapped onto the road 603. A turn may be identified based on the shape of road 603 (e.g., in area 610) and the correlation of the points 601 in area 610, which represent the reported locations of the vehicle in area 610. The turn may correspond to a subset of the location measurements (e.g., the points 601 in area 610).

In additional or alternative embodiments, the turn identification engine 512 may identify a turn using the movement measurements. For example, the turn identification engine 512 may receive yaw measurements in the movement measurements. The turn identification engine 512 may identify the turn in the vehicle by determining that at least one yaw measurements exceeds a threshold (i.e., the vehicle's measured twisting movement about a vertical axis is sufficient to conclude that the vehicle is turning). In some embodiments, the turn identification engine 512 may conclude that the vehicle is turning based on location measurements, and confirm that conclusion using movement measurements, or vice versa.

The subset determination engine 514 may determine a subset of the movement measurements that correspond to the turn in the vehicle that was identified by the turn identification engine 512. For example, the turn identification engine 512 may determine that yaw measurements from a gyroscope exceeded a threshold from a first time, t, to a second time, t+5. The subset determination engine 514 may then determine a subset of accelerometer measurements that were taken between the first time, t, and the second time, t+5. In another example, the turn identification engine 512 may determine that the location measurements from location determination sensor 502 corresponded to a turn on a road map from a third time, t+7, to a fourth time, t+12. The subset determination engine 514 may then determine a subset of accelerometer measurements that were taken between the third time, t+7, and the fourth time, t+12.

The acceleration estimation engine 516 may remove the subset of movement measurements identified by the subset determination engine 514 from the movement measurements reported by movement determination sensor 504. In the former example above, for example, the accelerometer measurements taken between the first time, t, and the second time, t+5, may be discarded by the acceleration estimation engine 516. The acceleration estimation engine 516 may then estimate an acceleration measurement for the vehicle using the remaining movement measurements. In the above example, if the trip lasted from time t to time t+99, the acceleration estimation engine 516 may estimate an acceleration measurement for the vehicle from time t+5 to t+99 using accelerometer measurements taken during that time. In some embodiments, the acceleration measurement may be estimated for shorter durations of time, i.e., intervals of the trip, as opposed to the entire remaining trip. For example, the acceleration estimation engine 516 may estimate an acceleration measurement for the vehicle from time t+5 to t+10, from time t+10 to t+15, and so on.

In some embodiments, the movement measurements made by the mobile device may need to be aligned with the vehicle in order to be accurate. The movement measurements made by the mobile device may be aligned with the vehicle by, for example, determining the orientation of the mobile device within the vehicle. In some embodiments, the movement made by the mobile device may need to be revised based on change in orientation of the mobile device with respect to the vehicle (i.e., movement of the mobile device within the vehicle).

Figure 7:
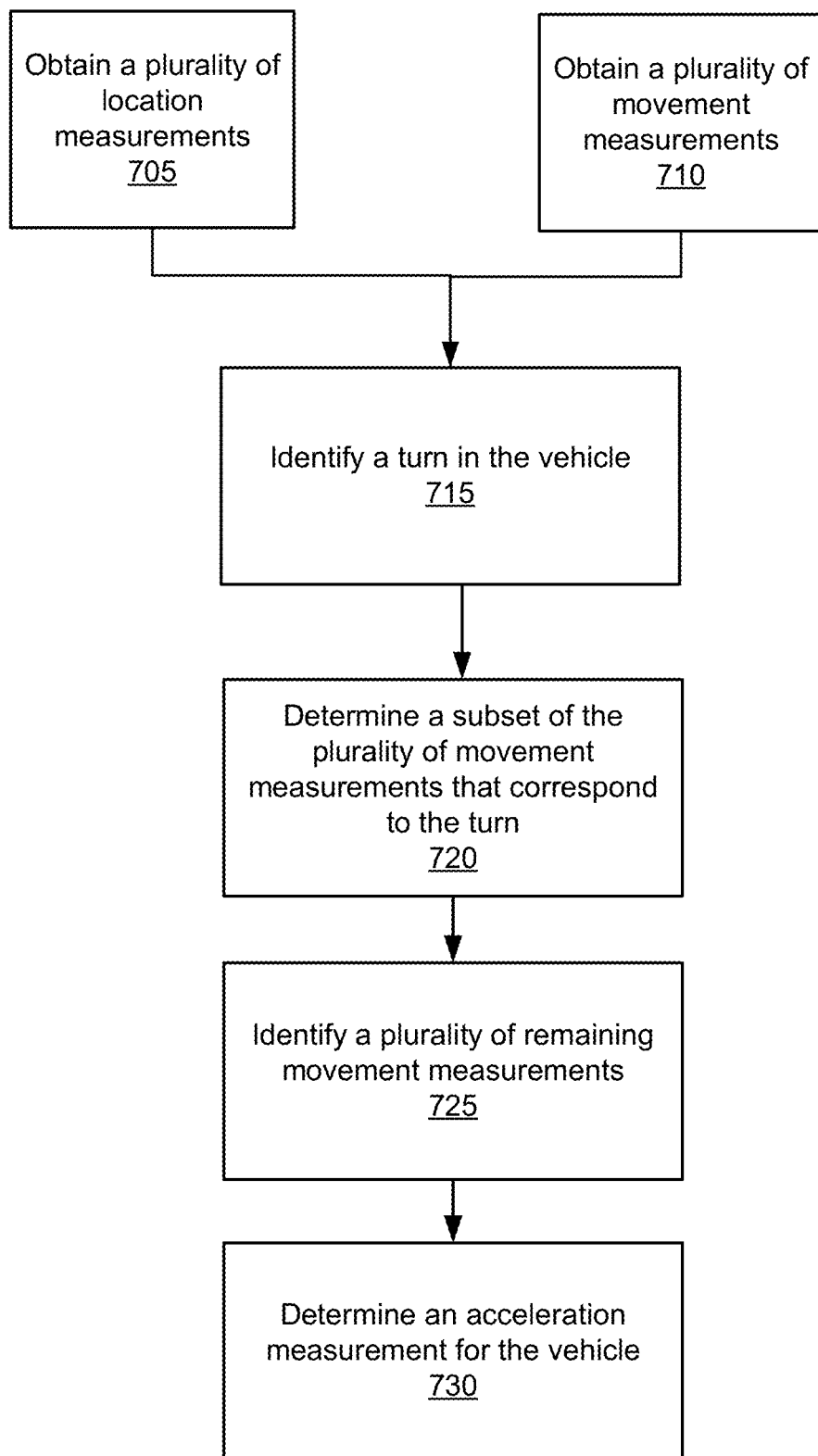
FIG. 7 is a flow diagram of a process for determining an acceleration measurement without turn measurements according to some embodiments of the invention.

FIG. 7 is a flow diagram of another method for determining an acceleration measurement for a vehicle. At block 705, a plurality of location measurements may be obtained from a location determination sensor of a mobile device during a trip in a vehicle. The location determination sensor may be a GPS device. At block 710, a plurality of movement measurements may be obtained from a movement determination sensor of the mobile device during the trip in the vehicle. The movement determination sensor may include at least one of an accelerometer or a gyroscope. Each of the plurality of location measurements may be associated with a movement measurement of the plurality of movement measurements. For example, a location measurement may be taken at the same time as a movement measurement.

At block 715, a turn in the vehicle may be identified using at least one of the plurality of location measurements or the plurality of movement measurements, as described further herein with respect to FIG. 6. In some embodiments, both the plurality of location measurements and the plurality of movement measurements may be used to identify the turn in the vehicle. When the plurality of location measurements are used, a road map corresponding to the plurality of location measurements may be identified, and the plurality of location measurements may be correlated to the road map to identify a turn. The turn may correspond to a subset of the plurality of location measurements. When the plurality of movement measurements are used, the plurality of movement measurements may include a plurality of yaw measurements. Then turn may be identified by determining that at least one of the plurality of yaw measurements exceeds a threshold, as described further herein.

At block 720, a subset of the plurality of movement measurements that correspond to the turn may be determined. For example, if the plurality of yaw measurements exceeds a threshold from time t to time t+2, the movement measurements taken between time t and time t+2 may be extracted. In another example, if location measurements taken from time t+1 to time t+4 correspond to a turn on a road map, the movement measurements taken between time t+1 and time t+4 may be extracted.

At block 725, a plurality of remaining movement measurements may be identified. The plurality of remaining movement measurements are identified by removing the subset of the plurality of movement measurements that correspond to the turn from the plurality of movement measurements. At block 730, an acceleration measurement for the vehicle may be determined using the plurality of remaining movement measurements. For example, accelerometer measurements may be used to determine the acceleration of the vehicle during the times outside of the turn. Thus, any inaccurate acceleration measurements taken during the turn of the vehicle may be excluded, resulting in a more accurate acceleration measurement.

At any point after the plurality of movement measurements are obtained, one or more orientations of the mobile device in the vehicle may be determined using the plurality of movement measurements. In some embodiments, if the mobile device is not aligned with the vehicle, the plurality of movement measurements may be revised using the orientation(s) of the mobile device in the vehicle in order to align the mobile device to the vehicle for acceleration estimation purposes, as described further herein.

Aligning a Mobile Device to a Vehicle for Accurate Acceleration Estimation

Figure 8:
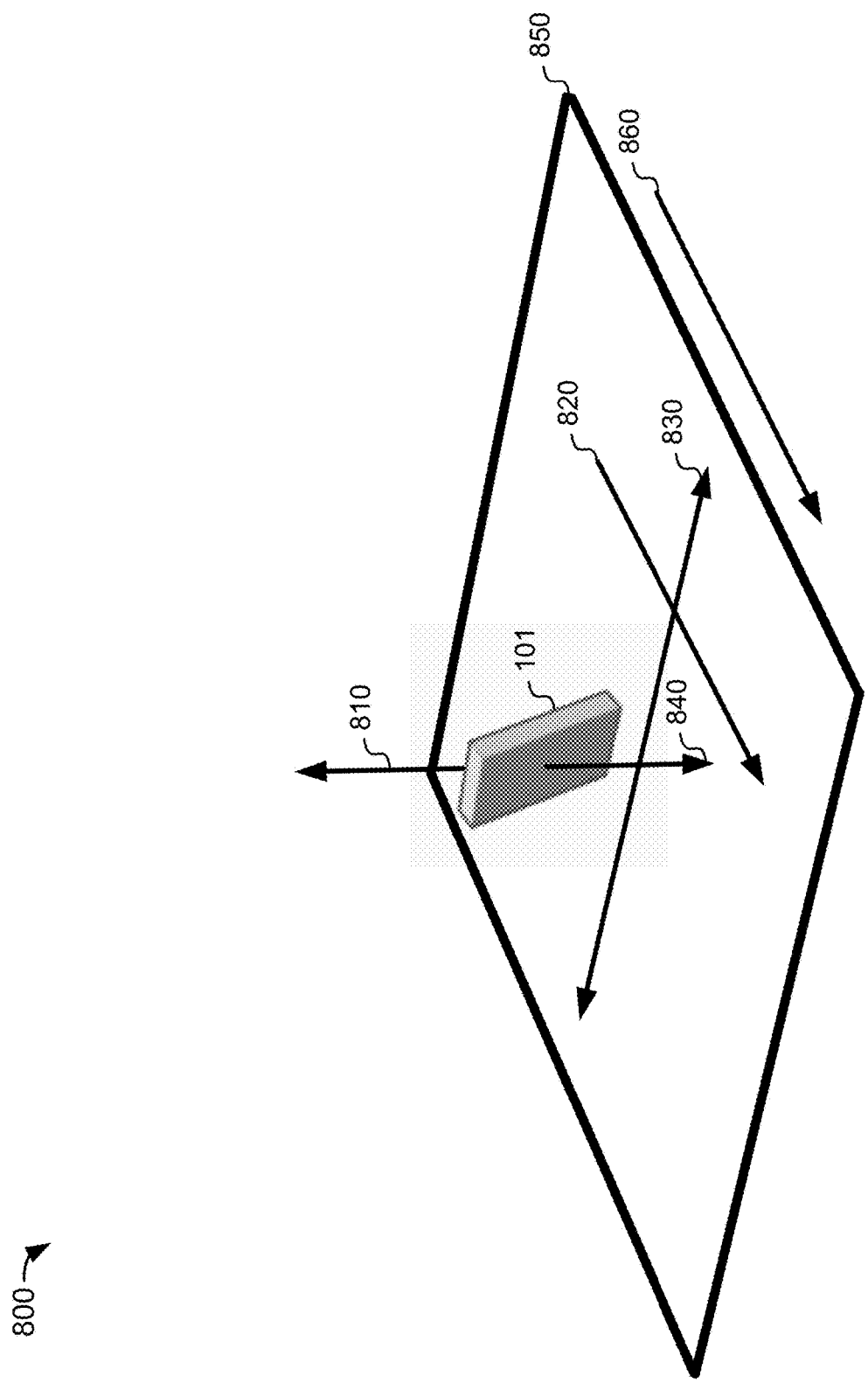
FIG. 8 is a block diagram of a mobile device in a vehicle according to some embodiments of the invention.

FIG. 8 is a block diagram of a mobile device 101 in a particular orientation in a vehicle 850, according to some embodiments. In some embodiments, as described in the incorporated '603 application, a Kalman filter may be applied to movement measurements from mobile device sensors to determine a gravity vector (e.g., gravity vector 840) for a mobile device (e.g., mobile device 101) in a moving vehicle (e.g., vehicle 850 moving in direction 860). In addition, a Kalman filter can also align mobile device 101 to vehicle 850 (e.g., determine the orientation of mobile device 101 relative to longitudinal acceleration 820 and lateral acceleration 830). For example, linear or non-linear Kalman filter equations may be used, including an extended Kalman filter, as described below.

Exemplary linear Kalman filter equations are as follows:
Prediction Phase
Predicted (a priori) state estimate:

$$\hat{x}_{k|k-1} = F_k \hat{x}_{k-1|k-1} + B_k u_k \quad (1)$$

Predicted (a priori) estimate covariance:

$$P_{k|k-1} = F_k P_{k-1|k-1} F_k^T + Q_k \quad (2)$$

Update Phase
Innovation or measurement residual:

$$\tilde{y}_k = z_k - H_k \hat{x}_{k|k-1} \quad (3)$$

Innovation (or residual) covariance:

$$S_k = H_k P_{k|k-1} H_k^T + R_k \quad (4)$$

Optimal Kalman gain:

$$K_k = P_{k|k-1} H_k^T S_k^{-1} \quad (5)$$

Updated (a posteriori) estimate covariance:

$$P_{k|k} = (I - K_k H_k) P_{k|k-1} \quad (6)$$

Wherein:
$\hat{x}_{k|k-1}$=the state estimate at time k given observations up to and including at time k
$F_k$=the state transition matrix
$B_k$=the control-input matrix
$u_k$=the control vector
$P_{k|k-1}$=the error covariance matrix (a measure of the estimated accuracy of the state estimate)
$Q_k$=the process noise covariance
$\tilde{y}_k$=the innovation (or measurement residual)
$z_k$=the measurement vector
$H_k$=the measurement matrix
$S_k$=the innovation (or residual) covariance
$R_k$=the measurement noise covariance
$K_k$=the optimal Kalman gain
I=the identity matrix Exemplary non-linear Kalman filter equations for an extended Kalman filter are as follows:
Prediction Phase
Predicted state estimate:

$$\hat{x}_{k|k-1} = f(\hat{x}_{k-1|k-1}, u_{k-1}) \quad (7)$$

Predicted covariance estimate:

$$P_{k|k-1} = F_{k-1} P_{k-1|k-1} F_{k-1}^T + Q_{k-1} \quad (8)$$

Update Phase
Innovation or measurement residual:

$$\tilde{y}_k = z_k - f(\hat{x}_{k|k-1}) \quad (9)$$

Innovation (or residual) covariance:

$$S_k = H_k P_{k|k-1} H_k^T + R_k \quad (10)$$

Near-optimal Kalman gain:

$$K_k = P_{k|k-1} H_k^T S_k^{-1} \quad (11)$$

Updated covariance estimate:

$$P_{k|k} = (I - K_k H_k) P_{k|k-1} \quad (12)$$

Updated state estimate:

$$\hat{x}_{k|k} = \hat{x}_{k|k-1} + K_k \tilde{y}_k \quad (13)$$

The state transition and observation matrices are defined to be the following Jacobians:

$$F_{k-1} = \frac{\partial f}{\partial x}\Big|_{\hat{x}_{k|k-1}, u_{k-1}} \quad (14)$$

$$H_k = \frac{\partial h}{\partial x}\Big|_{\hat{x}_{k|k-1}} \quad (15)$$

Wherein:
$\hat{x}_{k|k-1}$=the state estimate at time k given observations up to and including at time k
$f$=the state transition function (may be non-linear)
$B_k$=the control-input matrix
$u_k$=the control vector
$P_{k|k-1}$=the error covariance matrix (a measure of the estimated accuracy of the state estimate)
$Q_k$=the process noise covariance
$\tilde{y}_k$=the innovation (or measurement residual)
$z_k$=the measurement vector
h=the measurement function (may be non-linear)
$S_k$=the innovation (or residual) covariance
$R_k$=the measurement noise covariance
$K_k$=the optimal Kalman gain
I=the identity matrix In some embodiments, a gravity vector 840 can be determined based on a comparison of one or more movement measurements from the accelerometer 112 of the mobile device 101 with one or more movement measurements from the gyroscope 116 of the mobile device 101. Gyroscope 116 can generate a data set that measures angular velocity of the mobile device 101, and this can provide data associated with how the mobile device 101 is being rotated.

To determine a change in the orientation of mobile device 101 relative to vehicle 850, some embodiments analyze two gravity vectors associated with a time point (t), for example: gravity vectors G(t) before and after the time point (e.g., at t−15 seconds and t+15 seconds). By comparing these gravity vectors over a time interval, a difference in gravity angle (e.g., measured in radians), and gravity magnitude can be determined (respectively termed herein, gravity angle difference and gravity magnitude difference). It should be appreciated that a larger or smaller interval can also be used. It is also important to note that, while embodiments described herein are described as operating on stored data (i.e., after the drive has completed, not in real time), the components, principles and approaches described herein could also operate in substantially real-time (e.g., using a t−30 and t−15 interval, for example, to analyze gravity vectors, or other suitable approach).

In some embodiments, whether the mobile device 101 remained stationary within the vehicle during a time interval can be estimated by comparing the determined gravity angle difference, and the determined gravity magnitude difference to one or more thresholds. In an example of this threshold comparison, having a gravity angle difference above one (1) radian and a gravity magnitude difference above one (1) g indicate to an embodiment that the mobile device 101 likely moved relative to the vehicle 850 at time point (t). It is contemplated that different combinations of threshold values could be used, e.g., different gravity magnitude differences, different gravity angle differences, and/or requiring multiple consecutive differences over thresholds, before a change in orientation is estimated.

Another approach to aligning a mobile device with a vehicle uses a non-linear Kalman filter and quaternions. In this example, a quaternion ($q_w$, $q_x$, $q_y$, $q_z$) that describes the orientation of the aligned mobile device relative to the vehicle, and accelerometer data ($a_x$, $a_y$, $a_z$) are the state measurements. The measurement data includes acceleration as determined from GPS receiver 110 data (e.g., the derivative of speed), the determined gravity vector of mobile device 101, and three-axis acceleration data measured by accelerometer 112. The following equations may be used with the non-linear Kalman filter:

$$\hat{x}_{k|k-1} = \begin{pmatrix} q_w \\ q_x \\ q_y \\ q_z \\ a_x \\ a_y \\ a_z \end{pmatrix} \quad (16)$$

$$F_k = \begin{pmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix} \quad (17)$$

$$B_k = 0 \quad (18)$$

$$u_k = 0 \quad (19)$$

$$z_k = \begin{pmatrix} a_{gps} \\ g_x \\ g_y \\ g_z \\ a_{x,accel} \\ a_{y,accel} \\ a_{z,accel} \end{pmatrix} \quad (20)$$

$$Q_k = \begin{pmatrix} c_1 & 0 & 0 & 0 & 0 & 0 & 0 \\ 0 & c_2 & 0 & 0 & 0 & 0 & 0 \\ 0 & 0 & c_3 & 0 & 0 & 0 & 0 \\ 0 & 0 & 0 & c_4 & 0 & 0 & 0 \\ 0 & 0 & 0 & 0 & c_5 & 0 & 0 \\ 0 & 0 & 0 & 0 & 0 & c_6 & 0 \\ 0 & 0 & 0 & 0 & 0 & 0 & c_7 \end{pmatrix} \quad (21)$$

$$R_k = \begin{pmatrix} c_8 & 0 & 0 & 0 & 0 & 0 & 0 \\ 0 & c_9 & 0 & 0 & 0 & 0 & 0 \\ 0 & 0 & c_{10} & 0 & 0 & 0 & 0 \\ 0 & 0 & 0 & c_{11} & 0 & 0 & 0 \\ 0 & 0 & 0 & 0 & c_{12} & 0 & 0 \\ 0 & 0 & 0 & 0 & 0 & c_{13} & 0 \\ 0 & 0 & 0 & 0 & 0 & 0 & c_{14} \end{pmatrix} \quad (22)$$

Because, in this example, the measurement update function, h, is a non-linear function, it cannot be represented as a measurement update matrix H, but the function form of the non-linear measurement update function, $h(\tilde{x}_{k|k-1})$, may be given by:

$$h\left(\begin{bmatrix} a_{gps} \\ g_x \\ g_y \\ g_z \\ a_x \\ a_y \\ a_z \end{bmatrix}\right) = \begin{bmatrix} 2(q_x q_z - q_y q_w)a_x + \\ 2(q_y q_z + q_x q_w)a_y + (1 - 2q_x^2 - 2q_y^2)a_z \\ 2(q_x q_y - q_z q_w)(-9.8) \\ (1 - 2q_x^2 - 2q_z^2)(-9.8) \\ 2(q_y q_z + q_x q_w)(-9.8) \\ a_x \\ a_y \\ a_z \end{bmatrix} \quad (23)$$

As noted above, measuring changes in the determined quaternion in relation to the Earth can provide an alternative approach to determining when the vehicle is in a turn.

Combining Sensor Data Using a Complementary Error-State Kalman Filter

A complementary error-state Kalman filter may be used to combine GPS receiver 110 data (e.g., location measurements) and motion sensor data (e.g., movement measurements). In this example, the state variable may include the two-dimensional position, velocity, and acceleration of the vehicle in relation to the surface of the Earth, and the measurement variable may include one or both of data from GPS receiver 110 and one or more motion sensors.

Aligning Sensor Data for Accurate Acceleration Estimation Using a Compass

In some embodiments, sensor data collected with different reference frames can be transformed so that the sensor data are in the same reference frame. In some embodiments, some or all of the data produced by sensors, and update equations used to process this data, use the Earth's reference frame.

In this example, velocity (speed, bearing) may be measured directly from a location determination sensor (e.g., a GPS receiver) as to produce a two dimensional velocity vector (Vx, Vy) representing the car's velocity in the Earth's reference frame. A movement determination sensor (e.g., accelerometer 112) may provide acceleration data ($a_x$, $a_y$) in its own reference frame (e.g., its own casing), not the Earth's reference frame.

In some embodiments, using approaches described herein and in the Incorporated Applications, acceleration data from an accelerometer 112 can be transformed into the same reference frame (also termed herein "the same space") as a velocity vector by combining the acceleration measurements with gyroscope 116 and compass 119.

In some embodiments, these measurements (e.g., measurements from the GPS receiver 110, the gyroscope 116, the accelerometer 122, and the compass 119) may be aligned within the Earth's reference frame using a Kalman filter. In some examples, an unscented Kalman filter may be used. In other examples, any non-linear Kalman filter may be used. Exemplary values for an unscented Kalman filter (or any general non-linear Kalman filter) are shown below:

$$\hat{x}_{k|k-1} = \begin{pmatrix} v_x \\ v_y \\ a_x \\ a_y \end{pmatrix} \quad (24)$$

$$F_k = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix} \quad (25)$$

$$B_k = 0 \quad (26)$$

$$u_k = 0 \quad (27)$$

$$z_k = \begin{pmatrix} v_{x,gps} \\ v_{y,gps} \\ a_{x,accel} \\ a_{y,accel} \end{pmatrix} \quad (28)$$

$$H_k = \begin{pmatrix} 1 & 0 & 0 & 0 \\ 0 & 1 & 0 & 0 \\ 0 & 0 & 0 & 0 \\ 0 & 0 & 0 & 0 \end{pmatrix}, \text{ if } v_{y,gps} \text{ or } v_{y,gps} \text{ is measured} \quad (29)$$

$$H_k = \begin{pmatrix} 0 & 0 & 0 & 0 \\ 0 & 0 & 0 & 0 \\ 0 & 0 & \cos(\theta) & -\sin(\theta) \\ 0 & 0 & \sin(\theta) & \cos(\theta) \end{pmatrix}, \quad (30)$$

if $a_{x,accel}$ or $a_{y,accel}$ is measured $$H_k = \begin{pmatrix} 1 & 0 & 0 & 0 \\ 0 & 1 & 0 & 0 \\ 0 & 0 & \cos(\theta) & -\sin(\theta) \\ 0 & 0 & \sin(\theta) & \cos(\theta) \end{pmatrix}, \quad (31)$$

if all sensors are measured simulataneously $$Q_k = \begin{pmatrix} c_1 & 0 \\ 0 & c_2 \end{pmatrix} \quad (32)$$

$$R_k = \begin{pmatrix} c_3 & 0 \\ 0 & c_4 \end{pmatrix} \quad (33)$$

When using a non-linear Kalman filter as shown above, the state variables are $(v_x, v_y, a_x, a_y)$, or both velocity and acceleration in the Earth's reference frame. With this approach, speed and bearing $(v_x, v_y)$ are directly measured at the GPS update frequency and acceleration is measured at the faster accelerometer update frequency. Because the GPS and the movement determination sensors collect data at different frequencies, instances can occur where only a GPS measurement is available, only an accelerometer measurement is available, and where both types of sensors are available. Kalman measurement matrices ($H_k$) of different sizes may be implemented for different instances.

Using Kalman analysis approaches to analyze a series of collected sensor data from both GPS and motion sensors can provide a more accurate estimation of velocity and acceleration, while improving the efficiency of mobile device 101. For example, while different approaches improve accuracy by increasing the GPS sampling rate, the described Kalman filter approaches can achieve high accuracy without increasing the GPS sampling rate, which would otherwise deplete mobile device 101 power stores at a higher rate.

Aligning Sensor Data for Accurate Acceleration Estimation without Using a Compass In another example of combining location and movement measurements used by some embodiments, a variation of the approach discussed above is now presented. In some embodiments, some sensors may be unavailable at a higher frequency than other sensors. For example, compass 119 may frequently have unavailable or inaccurate data because of compass 119 calibration requirements. Without compass data, the accelerometer may only be able to align the accelerometer to gravity, not to the Earth.

This approach may use the approach described above applying a Kalman filter (unscented or generally non-linear), but without compass 119 data, i.e., $v_x$, $v_y$, $a_x$, and $a_y$ are estimated by combining accelerometer 112 data and gyroscope 116 data with GPS receiver 110 data. To compensate for missing compass 119 data, this approach may estimate an angle correction term ($\theta$). This angle correction term may be used to rotate the accelerometer reference frame around the gravity vector, and all accelerometer measurements may be rotated by this angle. It is contemplated that the angle correction term may be periodically adjusted based on bearing information provided by GPS receiver 110.

The following equations may be used by some embodiments to combine GPS receiver 110 data with gyroscope 116 and accelerometer 112 data using a Kalman filter. These equations assume an unscented Kalman filter, but it is contemplated that this approach may be applied to any general non-linear Kalman filter.

$$\hat{x}_{k|k-1} = \begin{pmatrix} v_x \\ v_y \\ a_x \\ a_y \\ \theta \end{pmatrix} \quad (34)$$

$$F_k = \begin{pmatrix} 1 & 0 & \Delta t & 0 & 0 \\ 0 & 1 & 0 & \Delta t & 0 \\ 0 & 0 & 1 & 0 & 0 \\ 0 & 0 & 0 & 1 & 0 \\ 0 & 0 & 0 & 0 & 1 \end{pmatrix} \quad (35)$$

$$B_k = 0 \quad (36)$$

$$u_k = 0 \quad (37)$$

$$z_k = \begin{pmatrix} v_{x,gps} \\ v_{y,gps} \\ a_{x,accel} \\ a_{y,accel} \end{pmatrix} \quad (38)$$

$$H_k = \begin{pmatrix} 1 & 0 & 0 & 0 & 0 \\ 0 & 1 & 0 & 0 & 0 \\ 0 & 0 & 0 & 0 & 0 \\ 0 & 0 & 0 & 0 & 0 \end{pmatrix}, \text{ if } v_{y,gps} \text{ or } v_{y,gps} \text{ is measured} \quad (39)$$

$$H_k = \begin{pmatrix} 0 & 0 & 0 & 0 & 0 \\ 0 & 0 & 0 & 0 & 0 \\ 0 & 0 & \cos(\theta) & -\sin(\theta) & 0 \\ 0 & 0 & \sin(\theta) & \cos(\theta) & 0 \end{pmatrix}, \quad (40)$$

if $a_{x,accel}$ or $a_{y,accel}$ is measured $$H_k = \begin{pmatrix} 1 & 0 & 0 & 0 & 0 \\ 0 & 1 & 0 & 0 & 0 \\ 0 & 0 & \cos(\theta) & -\sin(\theta) & 0 \\ 0 & 0 & \sin(\theta) & \cos(\theta) & 0 \end{pmatrix}, \quad (41)$$

if all sensors are measured simultaneously $$Q_k = \begin{pmatrix} c_1 & 0 \\ 0 & c_2 \end{pmatrix} \quad (42)$$

$$R_k = \begin{pmatrix} c_3 & 0 \\ 0 & c_4 \end{pmatrix} \quad (43)$$

In this approach, the system's state variables for the Kalman filter are ($v_x$, $v_y$, $a_x$, $a_y$, theta), where velocity and acceleration are still in the Earth's reference frame, acceleration data is provided by accelerometer 112 in its own reference frame, and theta describes the rotation of the accelerometer 112 data around gravity.

Using Kalman analysis approaches to analyze a series of collected sensor data from both GPS and movement determination sensors without compass 119 data can provide a more accurate estimation of velocity and acceleration by accounting for frequently missing motion sensor data. Other approaches would either provide results data less frequently or estimate results that have a lower accuracy.

Aligning Accelerometer Measurements to Vehicle Direction

As discussed herein, some embodiments use collected motion sensor data to align the accelerometer with the forward motion of the vehicle. The aligned accelerometer data can be combined with velocity data provided by GPS receiver 110 to yield a velocity and acceleration of the vehicle. Some embodiments to combine GPS receiver 110 data with aligned accelerometer 112 data using a Kalman filter. For example, a linear Kalman filter may be used with state variables of velocity and acceleration (v, a). With this approach, velocity ($v_x$, $v_y$) may be directly measured at the GPS update frequency and aligned acceleration may be measured at the faster accelerometer update frequency. Because the GPS and the inertial sensors collect data at different frequencies, instances can occur where only a GPS measurement is available, only an accelerometer measurement is available, and where both types of sensors are available. Some embodiments implement a different Kalman measurement matrix ($H_k$) for each of these instances, if only certain data is available.

Exemplary equations for a linear Kalman filter are as below:

$$\hat{x}_{k|k-1} = \begin{pmatrix} v \\ a \end{pmatrix} \quad (44)$$

$$F_k = \begin{pmatrix} 1 & \Delta t \\ 0 & 1 \end{pmatrix} \quad (45)$$

$$B_k = 0 \quad (46)$$

$$u_k = 0 \quad (47)$$

$$z_k = \begin{pmatrix} v_{gps} \\ a_{aligned\_accel} \end{pmatrix} \quad (48)$$

$$H_k = \begin{pmatrix} 1 & 0 \\ 0 & 0 \end{pmatrix}, \text{ if only } a_{gps} \text{ is measured} \quad (49)$$

$$H_k = \begin{pmatrix} 0 & 0 \\ 0 & 1 \end{pmatrix}, \text{ if only } a_{aligned\_accel} \text{ is measured} \quad (50)$$

$$H_k = \begin{pmatrix} 1 & 0 \\ 0 & 1 \end{pmatrix}, \quad (51)$$

if both sensors are measured simultaneously $$Q_k = \begin{pmatrix} c_1 & 0 \\ 0 & c_2 \end{pmatrix} \quad (52)$$

$$R_k = \begin{pmatrix} c_3 & 0 \\ 0 & c_4 \end{pmatrix} \quad (53)$$

Mediating Turn Status using a Kalman Filter

In some embodiments, a Kalman filter may be used to mediate accelerometer data based on turning status. In this exemplary Kalman filter, measurement noise covariance ($R_k$) (also termed uncertainty) can be automatically adjusted based on the confidence in the accuracy of collected sensor data. In some embodiments, $R_k$ is raised to increase uncertainty when turns are estimated. This increase can be a set value, or can be proportional in a linear or non-linear fashion to the extent to which the vehicle is estimated to be turning. The following equations may be used in these embodiments:

$$\hat{x}_{k|k-1} = \begin{pmatrix} v \\ a \end{pmatrix} \quad (54)$$

$$F_k = \begin{pmatrix} 1 & \Delta t \\ 0 & 1 \end{pmatrix} \quad (55)$$

$$B_k = 0 \quad (56)$$

$$u_k = 0 \quad (57)$$

$$z_k = \begin{pmatrix} v_{gps} \\ a_{accel} \end{pmatrix} \quad (58)$$

$$H_k = \begin{pmatrix} 1 & 0 \\ 0 & 0 \end{pmatrix}, \text{ if only } a_{gps} \text{ is measured} \quad (59)$$

$$H_k = \begin{pmatrix} 0 & 0 \\ 0 & 1 \end{pmatrix}, \text{ if only } a_{accel} \text{ is measured} \quad (60)$$

$$H_k = \begin{pmatrix} 1 & 0 \\ 0 & 1 \end{pmatrix}, \quad (61)$$

if both sensors are measured simulataneously $$Q_k = \begin{pmatrix} \alpha & 0 \\ 0 & \beta \end{pmatrix} \quad (62)$$

$$R_k = \begin{pmatrix} \gamma & 0 \\ 0 & \delta\varphi^2 \end{pmatrix} \quad (63)$$

Detecting Erroneous Data During Sensor Integration

Some embodiments use one or more approaches to mitigating erroneous data generated by some sensors. Various Kalman filter approaches have been described herein to predict the current value of state variables (e.g., velocity, acceleration), measure the state variables, compare the predictions with the measurements, and update the predictions based on the previously measured data.

After the comparison, innovation (y) is the difference between the measured data values and the predicted data values. In some embodiments, an innovation threshold is identified and applied in order to filter out certain potentially erroneous data values. These filtered values are not used to update the data set used by the Kalman filter to make future estimates. Filtering at this state can be used in addition to, or in lieu of the pre-processing of data discussed above.

This approach can be applied to any variation of Kalman filter discussed herein (e.g., linear or non-linear Kalman filters). The innovation threshold can be determined automatically, using different approaches, e.g., identified empirically, through data analysis (e.g., using noise reasoning, using a discriminative classifier, using an optimization routine), and/or other similar approaches.

The examples and embodiments described herein are for illustrative purposes only. Various modifications or changes in light thereof will be apparent to persons skilled in the art. These are to be included within the spirit and purview of this application.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
operating one or more sensors of a mobile device disposed in a vehicle during a drive to receive acceleration measurements and gyroscopic measurements, wherein the vehicle experiences an acceleration during a portion of the drive;
generating a gravity vector from the acceleration measurements and the gyroscopic measurements;
calculating a yaw estimate for the vehicle, wherein the yaw estimate is determined in a direction around an axis aligned with the gravity vector;
determining an estimate of an extent to which the vehicle is turning at a first time during the drive based on the yaw estimate for the vehicle and without using location data;

modifying the acceleration measurements corresponding to the first time based on the estimate of the extent to which the vehicle is turning at the first time to provide modified acceleration measurements; and estimating the acceleration experienced by the vehicle during the portion of the drive based on the modified acceleration measurements.

2. The method of claim 1, wherein modifying the acceleration measurements includes removing a portion of the acceleration measurements that correspond to a time period in which the vehicle is turning.

3. The method of claim 1, wherein modifying the acceleration measurements is further based on determining that the estimate of the extent to which the vehicle is turning is greater than a threshold.

4. The method of claim 1, wherein determining the estimate of the extent to which the vehicle is turning includes:

calculating a time derivative of the yaw estimate.

5. The method of claim 1, further comprising:

aligning a reference frame of the mobile device to a reference frame of the vehicle.

6. The method of claim 5, wherein aligning the reference frame of the mobile device to the reference frame of the vehicle is based on a non-linear Kalman filter and a quaternion that that represents an alignment of the mobile device relative to the vehicle.

7. The method of claim 1, wherein the gravity vector is generated using a Kalman filter.

8. A mobile device comprising:

one or more processors;

one or more sensors; and a non-transitory computer-readable medium storing instructions that when executed by the one or more processors, causes the one or processors to perform operations including:

operating the one or more sensors while the mobile device is disposed in a vehicle during a drive to receive acceleration measurements and gyroscopic measurements, wherein the vehicle experiences an acceleration during a portion of the drive;

generating a gravity vector from the acceleration measurements and the gyroscopic measurements;

calculating a yaw estimate for the vehicle, wherein the yaw estimate is determined in a direction around an axis aligned with the gravity vector;

determining an estimate of an extent to which the vehicle is turning at a first time during the drive based on the yaw estimate for the vehicle and without using location data;

modifying the acceleration measurements corresponding to the first time based on the estimate of the extent to which the vehicle is turning at the first time to provide modified acceleration measurements; and estimating the acceleration experienced by the vehicle during the portion of the drive based on the modified acceleration measurements.

9. The mobile device of claim 8, wherein modifying the acceleration measurements includes removing a portion of the acceleration measurements that correspond to a time period in which the vehicle is turning.

10. The mobile device of claim 8, wherein modifying the acceleration measurements is further based on determining that the estimate of the extent to which the vehicle is turning is greater than a threshold.

11. The mobile device of claim 8, wherein determining the estimate of the extent to which the vehicle is turning includes:

calculating a time derivative of the yaw estimate.

12. The mobile device of claim 8, further comprising:

aligning a reference frame of the mobile device to a reference frame of the vehicle.

13. The mobile device of claim 12, wherein aligning the reference frame of the mobile device to the reference frame of the vehicle is based on a non-linear Kalman filter and a quaternion that that represents an alignment of the mobile device relative to the vehicle.

14. The mobile device of claim 8, wherein the gravity vector is generated using a Kalman filter.

15. A non-transitory computer-readable medium storing instructions that when executed by one or more processors, causes the one or processors to perform operations including:

operating one or more sensors of a mobile device disposed in a vehicle during a drive to receive acceleration measurements and gyroscopic measurements, wherein the vehicle experiences an acceleration during a portion of the drive;

generating a gravity vector from the acceleration measurements and the gyroscopic measurements;

calculating a yaw estimate for the vehicle, wherein the yaw estimate is determined in a direction around an axis aligned with the gravity vector;

determining an estimate of an extent to which the vehicle is turning at a first time during the drive based on the yaw estimate for the vehicle and without using location data;

modifying the acceleration measurements corresponding to the first time based on the estimate of the extent to which the vehicle is turning at the first time to provide modified acceleration measurements; and estimating the acceleration experienced by the vehicle during the portion of the drive based on the modified acceleration measurements.

16. The non-transitory computer-readable medium of claim 15, wherein modifying the acceleration measurements includes removing a portion of the acceleration measurements that correspond to a time period in which the vehicle is turning.

17. The non-transitory computer-readable medium of claim 15, wherein modifying the acceleration measurements is further based on determining that the estimate of the extent to which the vehicle is turning is greater than a threshold.

18. The non-transitory computer-readable medium of claim 15, wherein determining the estimate of the extent to which the vehicle is turning includes:

calculating a time derivative of the yaw estimate.

19. The non-transitory computer-readable medium of claim 15, further comprising:

aligning a reference frame of the mobile device to a reference frame of the vehicle based on a non-linear Kalman filter and a quaternion that represents an alignment of the mobile device relative to the vehicle.

20. The non-transitory computer-readable medium of claim 15, wherein the gravity vector is generated using a Kalman filter.

* * * * *